O. H. HINMAN.
TAPPING DEVICE.
APPLICATION FILED OCT. 18, 1912.
1,065,248.
Patented June 17, 1913.
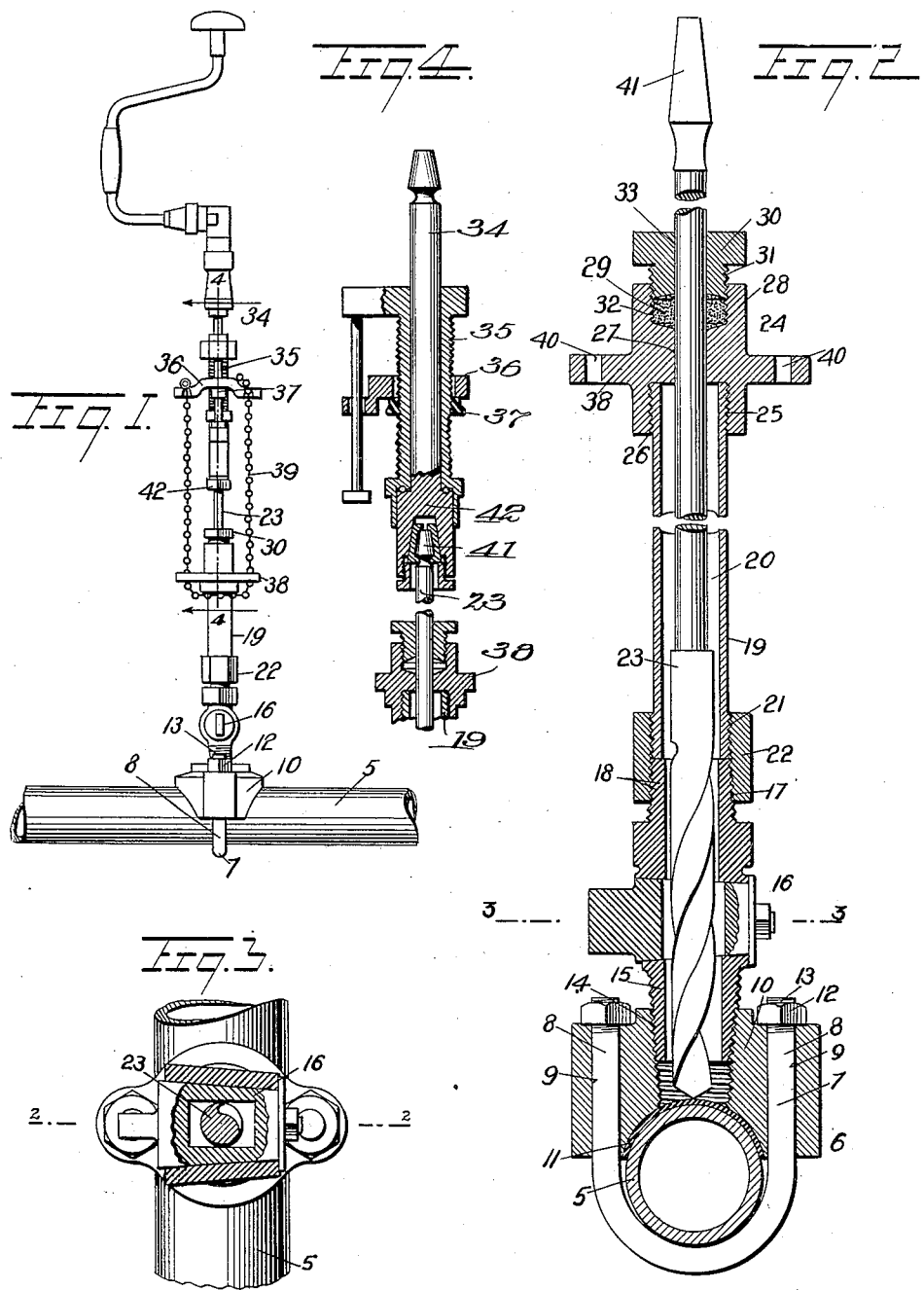
WITNESSES
H. T. Walker
E. B. Marshall
INVENTOR
Orlin H. Hinman,
BY Munn & Co
ATTORNEYS

UNITED STATES PATENT OFFICE.

ORLIN H. HINMAN, OF KENSINGTON, KANSAS.

TAPPING DEVICE.

1,065,248.

Specification of Letters Patent.

Patented June 17, 1913.

Application filed October 18, 1912. Serial No. 726,420.

*To all whom it may concern:*

Be it known that I, ORLIN H. HINMAN, a citizen of the United States, and a resident of Kensington, in the county of Smith and State of Kansas, have invented a new and Improved Tapping Device, of which the following is a full, clear, and exact description.

My invention has for its object to provide an inexpensive device for tapping a pipe containing a fluid, under pressure, without the loss of the fluid, and where the pipes are too thin for cutting threaded openings therein.

The device is constructed with a pipe saddle, connected with a member having a drill chamber by a valve, a drill extending into the drill chamber through a packing member, and through openings in the valve and saddle member, so that when an opening has been drilled in the pipe, the drill may be raised therefrom, without danger of the escape of the fluid, it being possible to turn the valve when the drill is raised thereabove, so that the member having the drill chamber may be removed with the drill. When the member having the drill chamber has been removed, a pipe may be connected with the valve to direct the fluid from the main pipe when the valve is again opened.

Another object of the invention is to provide simple and convenient means for operating the drill.

Still other objects of the invention will appear in the following complete specification, in which the preferred form of the invention is disclosed.

In the drawings similar characters of reference indicate corresponding parts in all the views, in which—

Figure 1 is a view showing my tapping device in position for use; Fig. 2 is a sectional view on the line 2—2 of Fig. 3; Fig. 3 is a sectional view on the line 3—3 of Fig. 2; and Fig. 4 is a fragmentary sectional view, on the line 4—4 of Fig. 1, showing how a brace is used with the tapping device.

By referring to the drawings it will be seen that on the main pipe 5, there is adjusted the pipe saddle 6, consisting of the U-shaped member 7, which extends under the main pipe 5, this U-shaped member 7 having terminals 8, which extend up through openings 9 in a saddle member 10, the saddle member 10 being separated from the main pipe 5 by a gasket 11. The saddle member 10 is held in position by the nuts 12, which mesh with the threads 13 on the terminals 8 of the U-shaped member 7, these nuts 12 pressing against the upper surface of the saddle member 10. It will therefore be seen that the gasket 11 will be held snugly between the main pipe 5 and the saddle member 10, so that when a hole is drilled through the gasket 11 in the main pipe 5, the gasket 11 will be disposed around this opening, and will prevent the leakage of the fluid contained in the main pipe 5, around the drill hole.

The saddle member 10 has a threaded opening 14, extending from its upper surface down to the gasket 11, and meshing in this threaded opening 14 there is a threaded projection 15 of a valve 16. This valve 16 has an outer thread 17 on a projecting portion 18, by which means it is secured to the member 19 having the drill chamber 20. This member 19 has a similar thread 21, the threads 17 and 21 being engaged by a threaded coupling member 22 for holding the member 19 in position above the valve 16. It will be noticed that the openings in the saddle member 10 and the valve 16 form a continuation of the drill chamber 20, so that a drill 23 disposed in the drill chamber 20 may extend through the openings in the valve and down to the gasket 11, so that when the drill 23 is rotated it will drill a hole through the gasket 11, and through that portion of the main pipe 5 adjacent thereto. One of the objects of the invention is to prevent the escape of a fluid under pressure in the main pipe 5, when an opening in the main pipe 5 has been drilled, and as the fluid will flow around the drill 23, as soon as it penetrates the main pipe 5, I provide means for preventing the escape of the fluid from the drill chamber 20. This means consists of a member 24 having a thread 25, meshing with a thread 26 at the upper terminal of the member 19, this member 24 having an opening 27, through which the drill 24 is disposed, there being a packing cavity 28 in the member 24 around the drill 27, in which is disposed a packing 29, which is pressed downward and against the drill 23 by means of the packing nut 30, which has an outer thread 31 meshing with the inner thread 32 in the packing cavity 28. The packing nut 30 has an opening 33, through which the drill 23 extends. It will therefore be seen that when the drill 23 penetrates the main pipe 5 the water will be prevented from escaping from the member 19. When the hole has been drilled in the main pipe, the drill 23 may be raised above the valve 16, when the valve 16 may be turned, after which the member 19 may be freed by loosening the coupling nut 22. When this has been done the member 19, with the drill 23, may be removed, and a pipe may be connected with the projecting portion 18 of the valve 16, to receive and direct the fluid when the valve 16 is again opened.

As a convenient, simple and inexpensive means for operating the drill, I provide a brace 34, having a threaded member 35, which is disposed through an opening in a flange plate 36, this flange plate 36 being held in position by a nut 37, which meshes with a thread on the threaded member, the flange plate 36 being connected with the flange 38 on the member 19, by means of the chain 39, which extends through the openings 40 in the flange 38, and through similar openings in the flange plate 36. It will be seen that when the upper terminal 41 of the drill 23 is connected with the member 42 of the brace 34, the chain 39 may be adjusted to hold the flange plate 36 down in the direction of the flange 38, by which means the drill may be pressed downward, as the brace 34 is operated.

Having thus described my invention, I claim as new and desire to secure by Letters Patent:

1. In a tapping device, a member having a drill chamber and an outwardly extending flange, a brace having a flange plate, means connecting the flange and flange plate to limit the movement of the brace away from the member having the drill chamber, and a drill extending into the drill chamber and connected with the brace to be operated thereby.

2. In a tapping device, a pipe saddle having an opening, a valve secured to the pipe saddle and having an opening connected with the first opening, a member having a drill chamber secured to the valve with its chamber in communication with the opening in the valve, a drill extending into the drill chamber and adapted to extend through the openings in the valve and in the pipe saddle, and a flange on the member, a brace having a flange plate, means connecting the flange and flange plate to limit the movement of the brace away from the drill chamber, and means connecting the brace with the drill for operating the latter.

3. In a tapping device, a member having a drill chamber and a flange, a brace having a threaded member, a flange plate having an opening through which the threaded member extends, a nut on the threaded member for pressing against the flange plate to move the flange into desired position, means connecting the flange and flange plate to limit the movement of the brace away from the member having the drill chamber, and a drill extending into the drill chamber and connected with the brace to be operated thereby.

4. In a tapping device, a member having a drill chamber and a flange, a brace, a flange plate, means by which the last-mentioned flange may be adjusted and held in position relatively to the brace, means connecting the flange and flange plate to limit the movement of the brace away from the member having the drill chamber, and a drill extending into the drill chamber and connected with the brace to be operated thereby.

In testimony whereof I have signed my name to this specification in the presence of two subscribing witnesses.

ORLIN H. HINMAN.

Witnesses:
C. W. BOWEN,
O. S. WOLFE.

---

Copies of this patent may be obtained for five cents each, by addressing the "Commissioner of Patents, Washington, D. C."